(12) United States Patent
Masuki

(10) Patent No.: US 9,091,799 B2
(45) Date of Patent: Jul. 28, 2015

(54) LENS BARREL AND IMAGING APPARATUS

(71) Applicant: CANON KABUSHIKI KAISHA, Tokyo (JP)

(72) Inventor: Akihiko Masuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 88 days.

(21) Appl. No.: 13/910,373

(22) Filed: Jun. 5, 2013

(65) Prior Publication Data

US 2014/0002914 A1   Jan. 2, 2014

(30) Foreign Application Priority Data

Jun. 27, 2012   (JP) .................................. 2012-143742

(51) Int. Cl.
*G02B 7/02*   (2006.01)
*G02B 7/04*   (2006.01)

(52) U.S. Cl.
CPC ................ *G02B 7/022* (2013.01); *G02B 7/023* (2013.01); *G02B 7/04* (2013.01)

(58) Field of Classification Search
CPC .................................. G02B 7/023; G02B 7/04
USPC .................................. 359/822, 823, 827, 829
See application file for complete search history.

(56) References Cited

U.S. PATENT DOCUMENTS

| | | | |
|---|---|---|---|
| 5,115,348 A | 5/1992 | Notagashira | |
| 5,237,362 A | 8/1993 | Ishino et al. | |
| 5,831,671 A * | 11/1998 | Chigira et al. | 348/208.8 |
| 6,282,380 B1 | 8/2001 | Yamamoto | |
| 6,927,921 B2 | 8/2005 | Yano | |
| 2005/0018319 A1 | 1/2005 | Yano | |

FOREIGN PATENT DOCUMENTS

| | | |
|---|---|---|
| CN | 1573398 A | 2/2005 |
| JP | 2000-193877 A | 7/2000 |

OTHER PUBLICATIONS

Apr. 17, 2015 Chinese Official Action in Chinese Patent Appl. No. 201310263471.7.

* cited by examiner

*Primary Examiner* — William Choi
(74) *Attorney, Agent, or Firm* — Fitzpatrick, Cella, Harper & Scinto

(57) ABSTRACT

A lens barrel includes a lead screw that is rotatably driven by a focus motor, a pulse plate that is provided at a root section of the lead screw on the focus motor side and rotates integrally with the lead screw, a photo interrupter holder that holds a photo interrupter configured to detect a signal of the pulse plate, a rack that is screwed to the lead screw and advances or retracts in the direction of the optical axis of an imaging optical system in accordance with the rotation drive of the lead screw, and a fourth group holder that holds a fourth group lens and advances or retracts in the direction of the optical axis by engaging with the rack. When the fourth group holder is retracted toward the focus motor side, the pulse plate and the fourth group holder or the fourth group lens are overlapped with each other as viewed from the direction orthogonal to the optical axis.

15 Claims, 9 Drawing Sheets

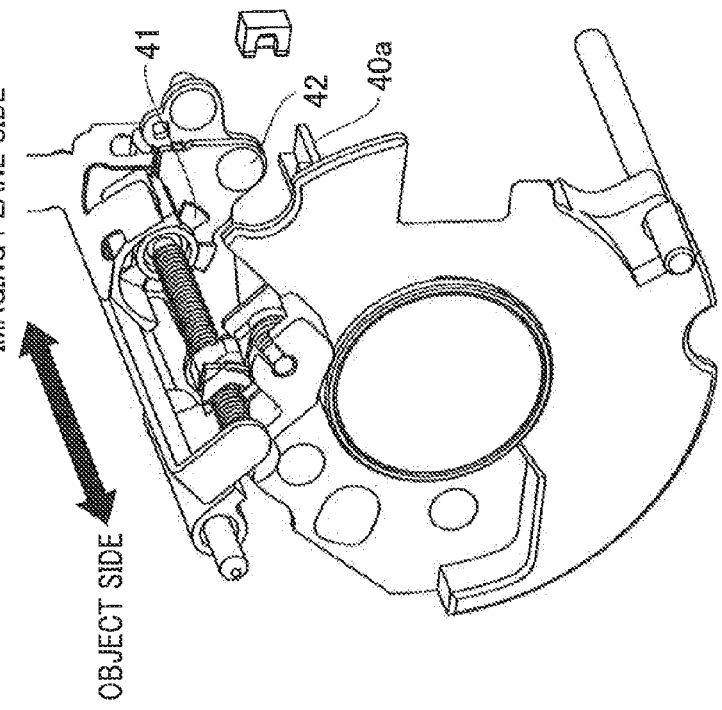
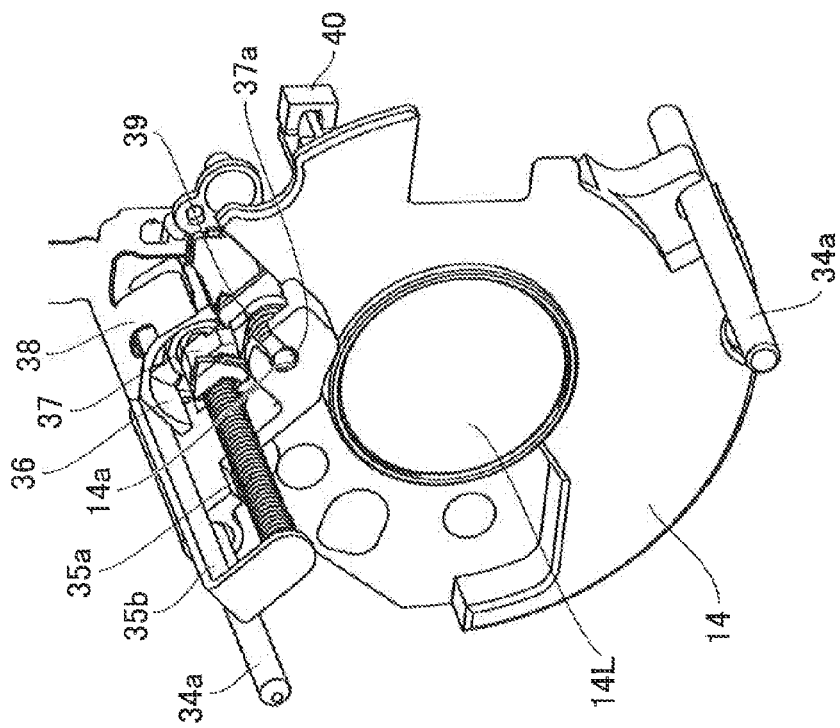

though the electric current is passed
LENS BARREL AND IMAGING APPARATUS

BACKGROUND OF THE INVENTION

1. Field of the Invention

The present invention relates to a lens barrel and an imaging apparatus.

2. Description of the Related Art

There has been proposed a lens barrel including a zoom mechanism that moves a plurality of optical lenses in the optical axis direction so as to change an imaging magnification. In the lens barrel, a lens holding frame for holding a lens is engaged with a cam groove of a cam barrel for rotation and the rotation of the lens holding frame is restricted by a linear barrel so as to move in the optical axis of the lens barrel. In addition, the lens holding frame of a focus group is independent of the lens holding frame of another group engaged with the cam barrel and advances or retracts by a screw attached to a focus motor, a nut and a rack which mesh with the screw in the optical axis direction according to the rotation of the screw. The screw-type focus mechanism is widely used. Japanese Patent Laid-Open No. 2000-193877 discloses a device that corrects the amount of movement of the lens holding frame in the optical axis direction by detecting the rotation of the screw using a signal detecting unit such as a photo interrupter, a photo reflector, or the like.

FIG. 9 is a diagram illustrating an example of a configuration of a device disclosed in Japanese Patent Laid-Open No. 2000-193877. As shown in FIG. 9, a stepping motor for focus drive is provided with a pulse plate 121 and a photo interrupter 122 for detecting a signal of the pulse plate 121 at its distal end via a screw 109. When an electric current is passed through the stepping motor, the screw 109 rotates, a nut 118 which meshes with the screw 109 advances or retracts in the optical axis direction, and a focus lens holding frame 108 engaged with the nut 118 and a lens 107 also advance and retract following the movement of the nut 118. At this time, the pulse plate 121 which is integrally attached to the screw 109 also rotates, and the signal of the pulse plate 121 is counted by the photo interrupter 122. When a difference occurs between a feed pulse and a count pulse in the camera operating temperature, the difference can be corrected so as to obtain appropriate focus of the image.

However, in the device disclosed in Japanese Patent Laid-Open No. 2000-193877 as shown in FIG. 9, a lens holding frame cannot be entered into a portion L at which the pulse plate 121 and the photo interrupter 122 are attached to a base plate 101 in the range of use of space in the focus mechanism. Thus, in the device disclosed in Japanese Patent Laid-Open No. 2000-193877, a space other than the portion is used as a focus stroke. Thus, a distance which can be used as a focus stroke within the space occupied by the focus mechanism in the optical axis direction is shortened, resulting in degradation of the specification of focus. In addition, since the pulse plate 121 is attached to the distal end of the screw 109, stability of counting of fine signals may be inhibited by the large influence of tilt or vibration of the long screw 109.

SUMMARY OF THE INVENTION

The present invention provides a lens barrel that ensures stability of counting a signal of a pulse plate and has an enhanced degree of freedom in focus stroke within a limited space.

According to an aspect of the present invention, a lens barrel is provided that includes a drive unit; a lead screw that is provided on an axis of the drive unit and is rotatably driven by the drive unit; a pulse plate that is provided at a root section of the lead screw on the drive unit side and rotates integrally with the lead screw; a holding member that holds at least one detecting unit configured to detect a signal of the pulse plate; a linear motion member that is screwed to the lead screw and advances or retracts in the direction of the optical axis of an imaging optical system in accordance with the rotation drive of the lead screw; and a lens holding frame that holds a lens which is part of the imaging optical system and advances or retracts in the direction of the optical axis by engaging with the linear motion member. When the lens holding frame is retracted toward the drive unit side, the pulse plate and the lens holding frame or the lens are overlapped with each other as viewed from the direction orthogonal to the optical axis.

According to the present invention, an imaging apparatus that ensures stability of pulses by arranging a pulse plate for focus control on the motor side and has an enhanced degree of freedom in focus stroke within a limited space may be provided.

Further features of the present invention will become apparent from the following description of exemplary embodiments with reference to the attached drawings.

BRIEF DESCRIPTION OF THE DRAWINGS

FIGS. 5A and 5B are perspective views illustrating an exemplary fourth group holder.

DESCRIPTION OF THE EMBODIMENTS (First Embodiment)

Figure 1:
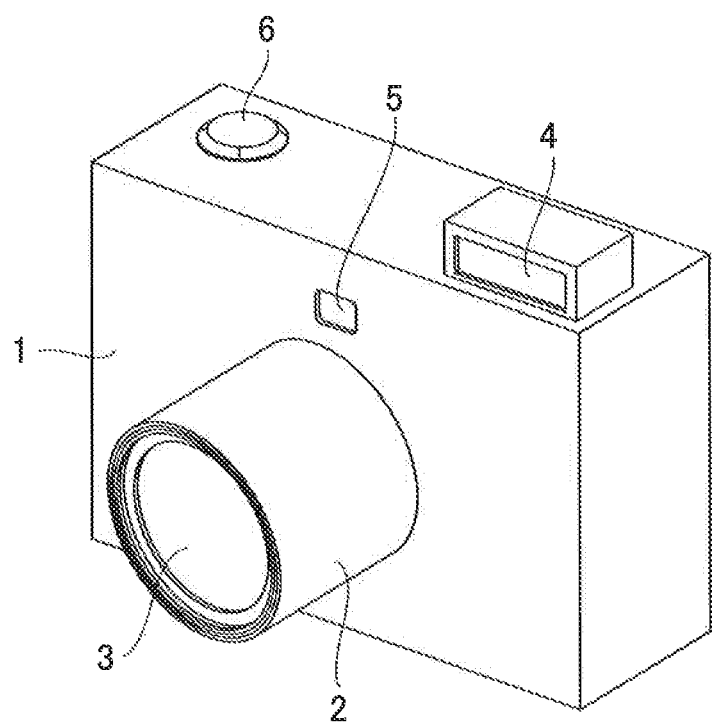
FIG. 1 is a schematic view illustrating an example of an external appearance of an imaging apparatus according to a first embodiment.

FIG. 1 is a schematic view illustrating an example of an external appearance of an imaging apparatus according to the present embodiment. A camera main body 1 has a lens barrel 2 which can change a focal distance of a photographing lens on the front surface. A lens cap for protecting a lens 3 is attachable to the front surface of the lens barrel 2. Also, a light-emitting window unit 4 that constitutes a strobe device for irradiating an object with illumination light is provided on the top surface of the camera main body 1 and a finder window 5 is provided on the front surface of the camera main body 1.

A release button 6 that starts the photography preparing operation (focus adjusting operation and light measuring operation) and the photographing operation (exposure to an imaging element such as a film, a sensor, or the like) is provided on the top surface of the camera main body 1. The photography preparing operation such as a light measuring operation, an auto focus (AF) operation, or the like is performed by the half-press operation (SW1 press) on the release button 6, and the image photographing operation (so-called permanent exposure) and the recording operation is performed by the full-press operation (SW2 press) on the release button 6. Note that the imaging apparatus of the present invention is not limited to the configuration shown in FIG. 1.

Figure 2:
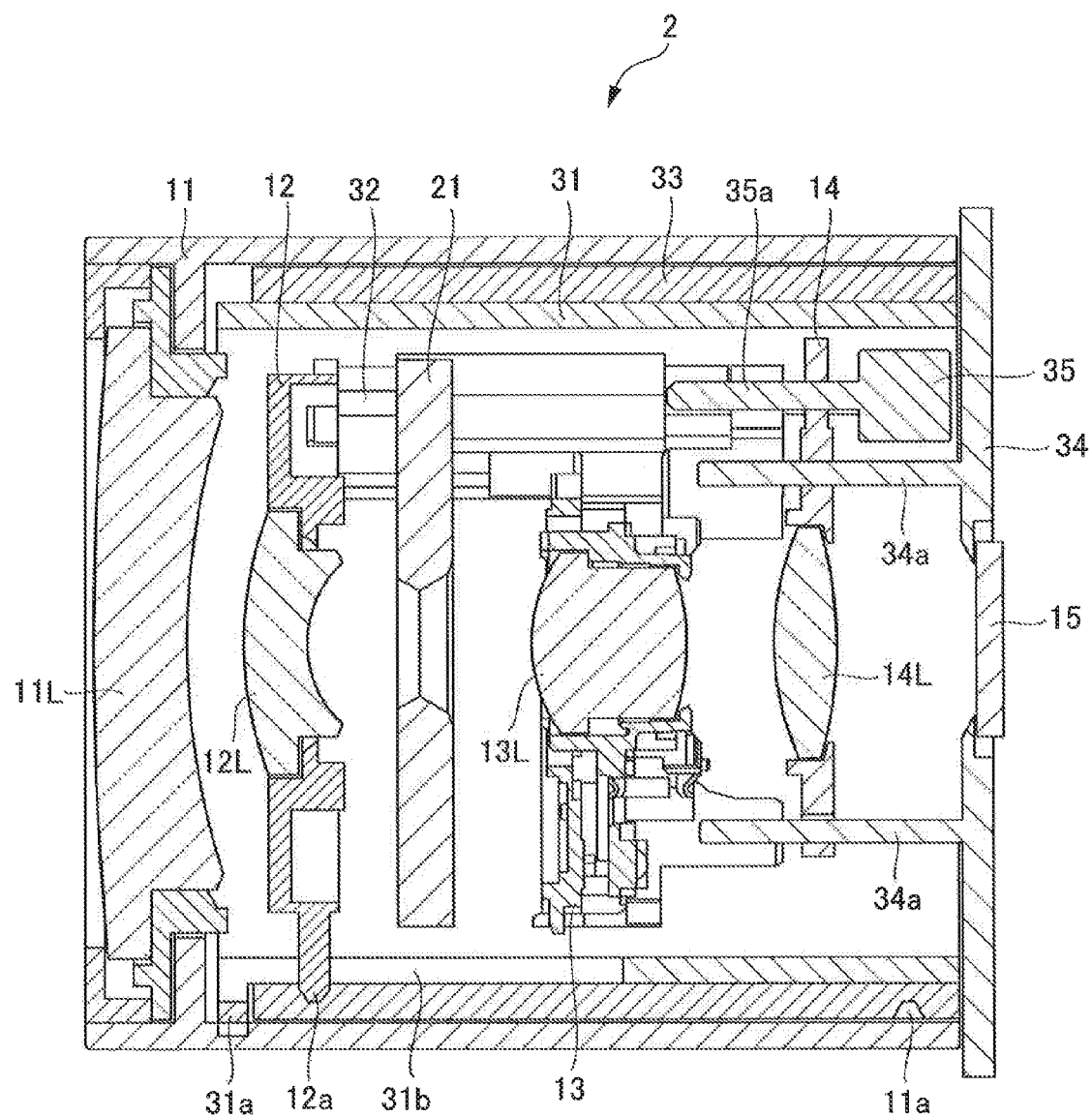
FIG. 2 is a cross-sectional view illustrating an exemplary lens barrel of an imaging apparatus.
Figure 3:
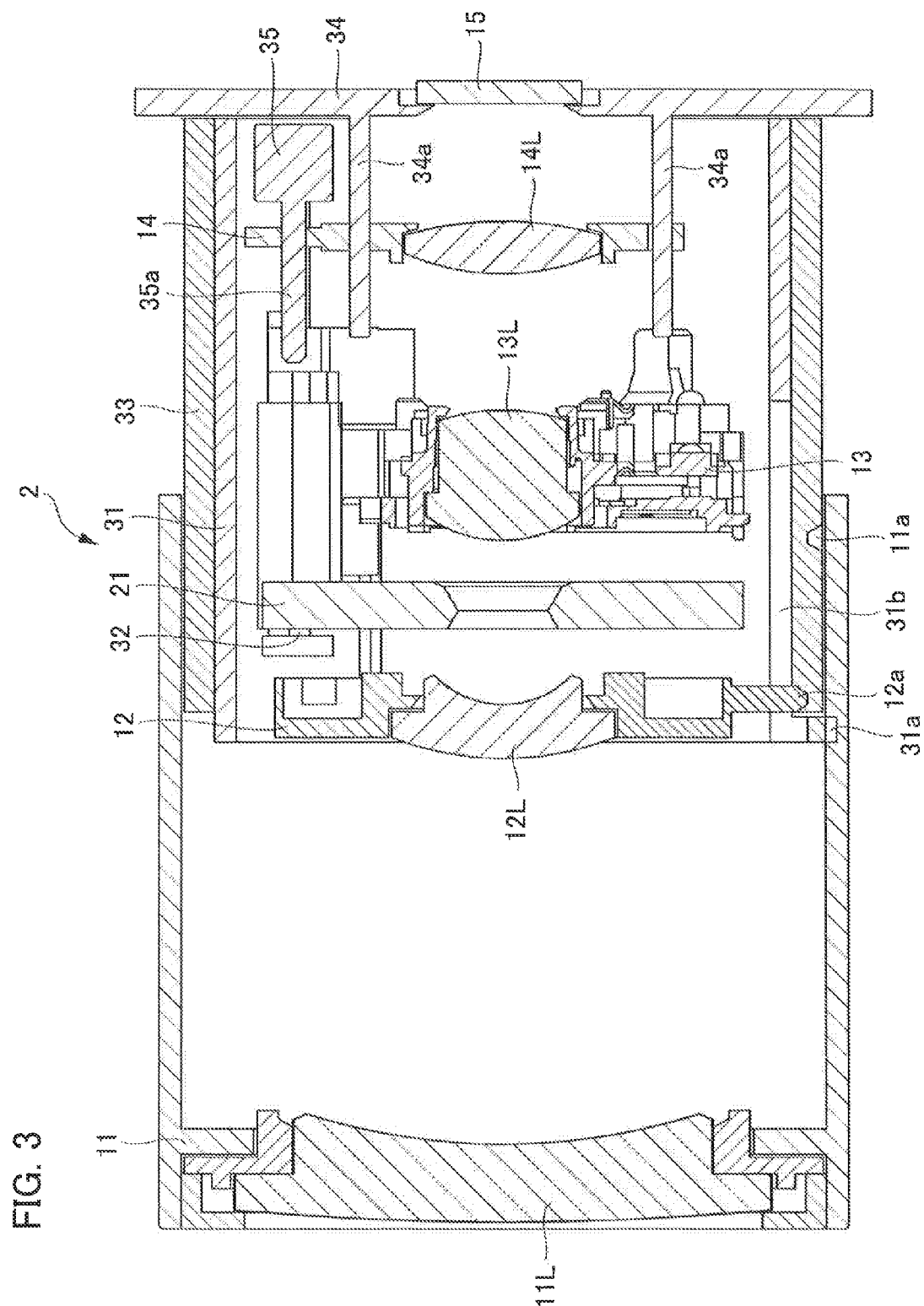
FIG. 3 is a cross-sectional view illustrating an exemplary lens barrel of an imaging apparatus.
Figure 4:
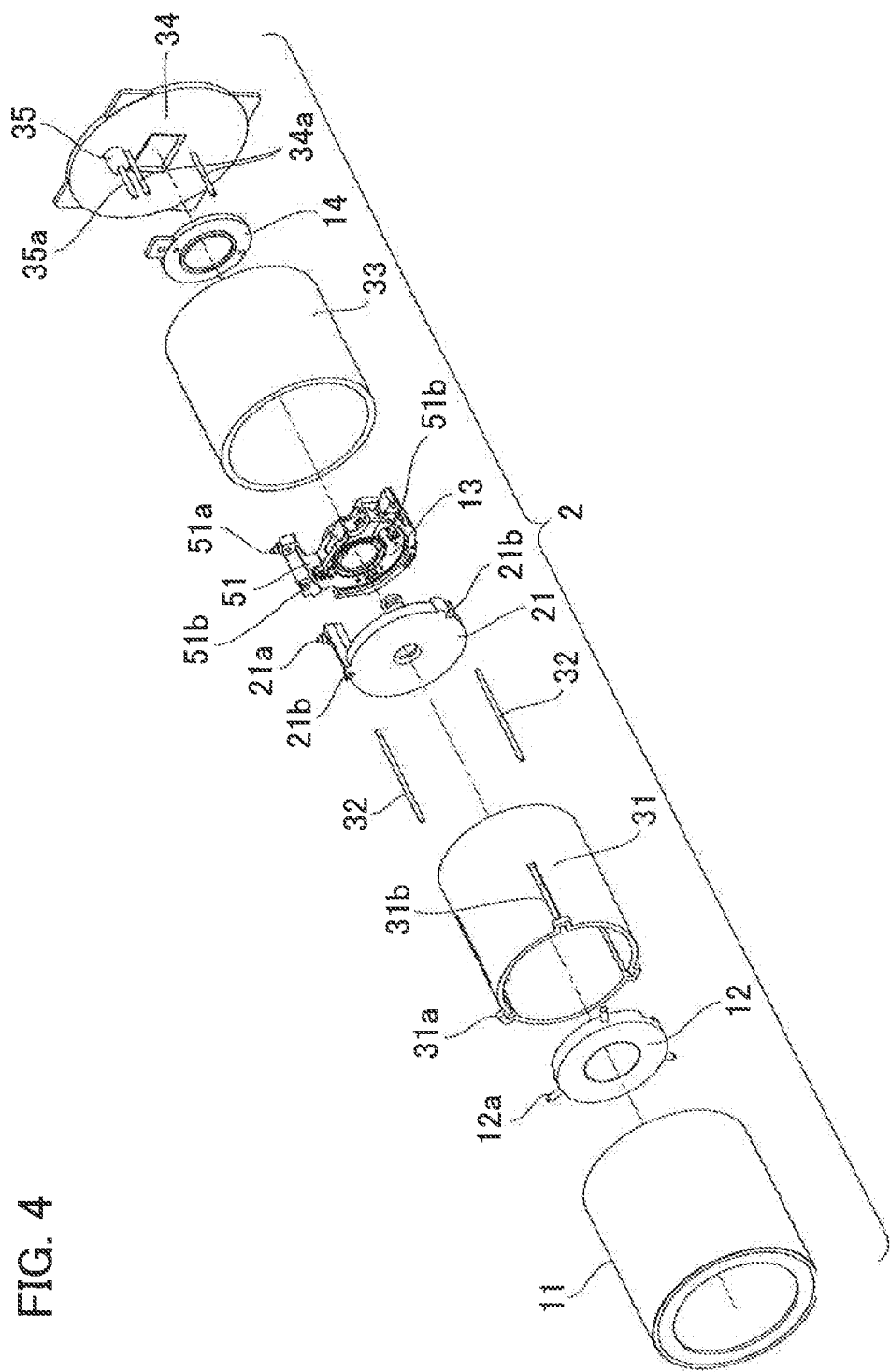
FIG. 4 is an exploded perspective view illustrating an exemplary lens barrel of an imaging apparatus.

FIG. 2 and FIG. 3 are cross-sectional views illustrating an exemplary barrel of an imaging apparatus. FIG. 2 is a cross-sectional view illustrating an exemplary lens barrel of an imaging apparatus when the lens barrel 2 (shown in FIG. 1) is in a retracted state. FIG. 3 is a cross-sectional view illustrating an exemplary lens barrel of an imaging apparatus in an imaging state. FIG. 4 is an exploded perspective view illustrating an exemplary lens barrel of an imaging apparatus.

As shown in FIGS. 1 to 4, an imaging optical system provided in the lens barrel of the present embodiment includes a photographing lens group consisting of four lens groups. A first group lens 11L, a second group lens 12L, a third group lens 13L, and a fourth group lens 14L are arranged in order from the object side toward the imaging element side in the optical axis direction. The first group lens 11L is held in a first group barrel 11, the second group lens 12L is held in a second group holder 12, and the third group lens 13L is held in a third group unit 13. The fourth group lens 14L which is a focus lens group is held in a fourth group holder 14. The lens barrel 2 has a mechanism that holds a photographing lens group which consists of four groups and is capable of advancing and retracting the photographing lens group in the optical axis direction. Also, the lens barrel 2 functions as a camera by being installed on a camera body 1.

Next, a description will be given of the internal configuration of the lens barrel 2 and the operation performed thereby. A fixed barrel 31 includes a guide portion 31a that linearly guides the first group barrel 11 in the optical axis direction and a guide groove 31b that linearly guides the second group holder 12 in the optical axis direction. A linear motion groove (not shown) that is provided on the radially inside of the first group barrel 11 engages with the guide portion 31a of the fixed barrel 31. In the second group holder 12, a cam pin 12a engages with the guide groove 31b of the fixed barrel 31. With this arrangement, the second group holder 12 is linearly guided in the optical axis direction.

The fixed barrel 31 holds two guide bars 32 on the inside diameter side thereof, respectively. The guide bar 32 engages with a guide portion 21b (shown in FIG. 4) of an aperture shutter unit 21 that controls the amount of light. Also, the guide bar 32 engages with an engaging portion 51b (shown in FIG. 4) that is provided in a third group base 51 in the third group unit 13. With the aid of the rotation restriction of these two guide bars 32, the aperture shutter unit 21 and the third group unit 13 are linearly guided in the optical axis direction.

A cam groove (not shown) is provided on the outside diameter side of a cam barrel 33 and engages with a cam pin 11a of the first group barrel 11. Also, a cam groove (not shown) is provided on the inside diameter side of the cam barrel 33 and engages with the cam pin 12a of the second group holder 12, the cam pin 21a (shown in FIG. 4) of the aperture shutter unit 21, and the cam pin 51a (shown in FIG. 4) of the third group base 51 in the third group unit 13, respectively. The amount of movement of these groups in the optical axis direction is controlled by the amount of lift of these cam grooves.

With the aid of a power source (not shown), the cam barrel 33 rotates about the optical axis around the outer periphery of the fixed barrel 31. Each group moves along the cam groove in the optical axis direction in accordance with the rotation of the cam barrel 33. With this arrangement, the lens barrel 2 changes the entire length of the barrel in an imaging state and in a retracted state so that each group can be moved in the optical axis direction.

A sensor holder 34 holds an imaging element 15 and a focus motor 35. With the aid of the power of the focus motor 35 that functions as a drive unit, the fourth group holder 14 moves in the optical axis direction while being guided by a guide shaft 34a. The fixed barrel 31 and the sensor holder 34 are fixed by screws or the like. Also, the unitized lens barrel 2 is fixed by screws or the like via the sensor holder 34 and is held in the camera body 1.

Figure 6:
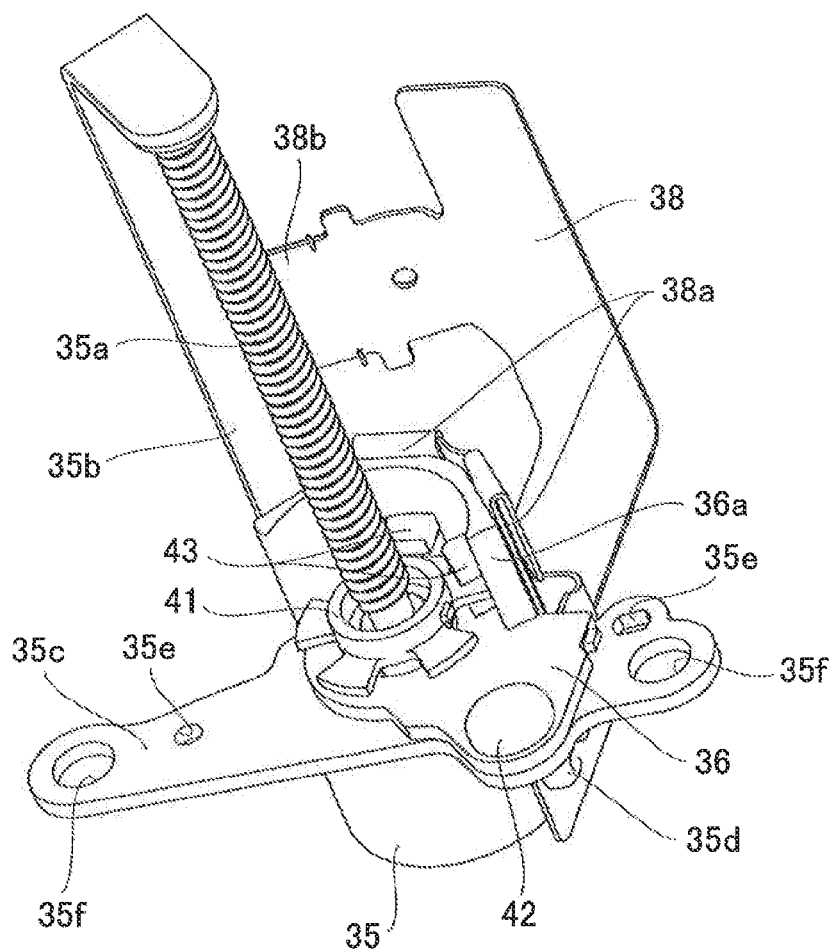
FIG. 6 is a perspective view illustrating an exemplary focus motor unit.

Next, a description will be given of a mechanism on the periphery of the fourth group (focus lens group) with reference to FIG. 5A, FIG. 5B, and FIG. 6. FIGS. 5A and 5B are perspective views illustrating an exemplary fourth group holder. FIG. 5A shows the fourth group holder in a retracted state. FIG. 5B shows the fourth group holder in an advanced state. FIG. 6 is a perspective view illustrating an exemplary focus motor unit provided in the imaging apparatus of the present embodiment.

As shown in FIGS. 5A and 5B, the fourth group holder 14 has a shaft hole portion 14a. A shaft 37a of a rack 37 is engaged with the shaft hole portion 14a. Backlash in the optical axis direction is removed by a compression spring 39. The compression spring 39 also functions as a torsion spring that urges a part of a tooth of the rack 37 to a lead screw 35a. The rack 37 is screwed to the lead screw 35a and functions as a linear motion member that advances or retracts in the optical axis direction in accordance with the rotation drive of the lead screw 35a.

As shown in FIG. 6, the lead screw 35a is provided on an axis of the focus motor 35. The lead screw 35a is rotatably driven by the focus motor 35 to thereby cause the fourth group lens 14L (shown in FIG. 5A) to advance and retract in the optical axis direction. More specifically, the fourth group holder 14 that serves as the lens holding frame for holding the fourth group lens 14L advances or retracts in the optical axis direction by engaging with the rack 37. The pulse plate 41 is fixed at the root section on the focus motor 35 side of the lead screw 35a. The pulse plate 41 rotates integrally with the lead screw 35a. A signal of the pulse plate 41 is counted by, for example, two photo interrupters 43 and then the phase difference between the light and dark (ON and OFF) is obtained to thereby detect the direction of rotation. In other words, the photo interrupter 43 functions as a detecting unit that detects a signal of the pulse plate 41. The photo interrupter 43 is held by the photo interrupter holder 36 serving as the holding member. In this example, since two photo interrupters 43 are employed, about the axis of the focus motor 35, adjacent detecting units, i.e., photo interrupters 43 are disposed in the radial direction about the rotational axis of the lead screw 35a so as to form a predetermined angle therebetween. For example, when three photo interrupters 43 are employed, it is contemplated that three photo interrupters 43 are adjacently disposed in the radial direction around the rotation axis of the lead screw 35a so as to form a substantially equivalent angle therebetween. In other words, when the photo interrupter 43 is provided in plural, the photo interrupter holder 36 holds the photo interrupters 43 such that, about the axis of the focus motor 35, the photo interrupters 43 are disposed in the radial direction about the rotational axis of the lead screw 35a so as to form a predetermined angle between adjacent photo interrupters 43. While, in the example shown in FIG. 6, the lens barrel is provided with a plurality of (two) photo interrupters, the lens barrel may include at least one photo interrupter 43.

A photo interrupter holder 36 is fastened by a flange portion 35c of the focus motor 35 and a screw 42. The flange portion 35c is fixed on the object side of the focus motor 35 (see FIG. 6). The signal lines of the photo interrupter 43 are drawn from a surface mount portion 38a, integrated with signal lines from the terminal section 35d of the focus motor 35 by a flexible substrate (hereinafter referred to as "flexible") 38, and then are electrically connected from a connector section 38b to the external.

In the present embodiment, the focus motor 35, the lead screw 35a, the pulse plate 41, the photo interrupter 43, the photo interrupter holder 36, and the flexible 38 are unitized as a component (a focus motor unit). Thus, performance characteristics of the focus motor 35 can be checked and the signals of the light and dark (ON and OFF) of the photo interrupter 43, a phase difference between two signals, and the like can be collectively detected for management. The focus motor unit is contained in the fixed barrel 31. The focus motor 35 is positioned with respect to the sensor holder 34 by a positioning hole 35e and is fastened with the sensor holder 34 by a screw through a screw hole 35f. A pulse signal for rotating the focus motor 35 by the pulse plate 41 is used for step out detection of the focus motor 35, pulse correction of the fourth group holder 14, and the like.

When the focus motor 35 is excited, the lead screw 35a rotates to thereby advance and retract the rack 37 meshing with the lead screw 35a in the optical axis direction. At this time, the fourth group holder 14 also advances or retracts in the optical axis direction in a manner following the rack 37 so that the fourth group holder 14 can be moved to a desired position by a predetermined feed pulse. When the projection 40a (shown in FIGS. 5A and 5B) of the fourth group holder 14 enters into a photo interrupter 40, the photo interrupter 40 outputs a dark (OFF) signal. When the fourth group holder advances as shown in FIG. 5B, the photo interrupter 40 outputs a light (ON) signal. A timing at which a signal is switched between light and dark serves as a reference for the feed pulse.

Figure 7:
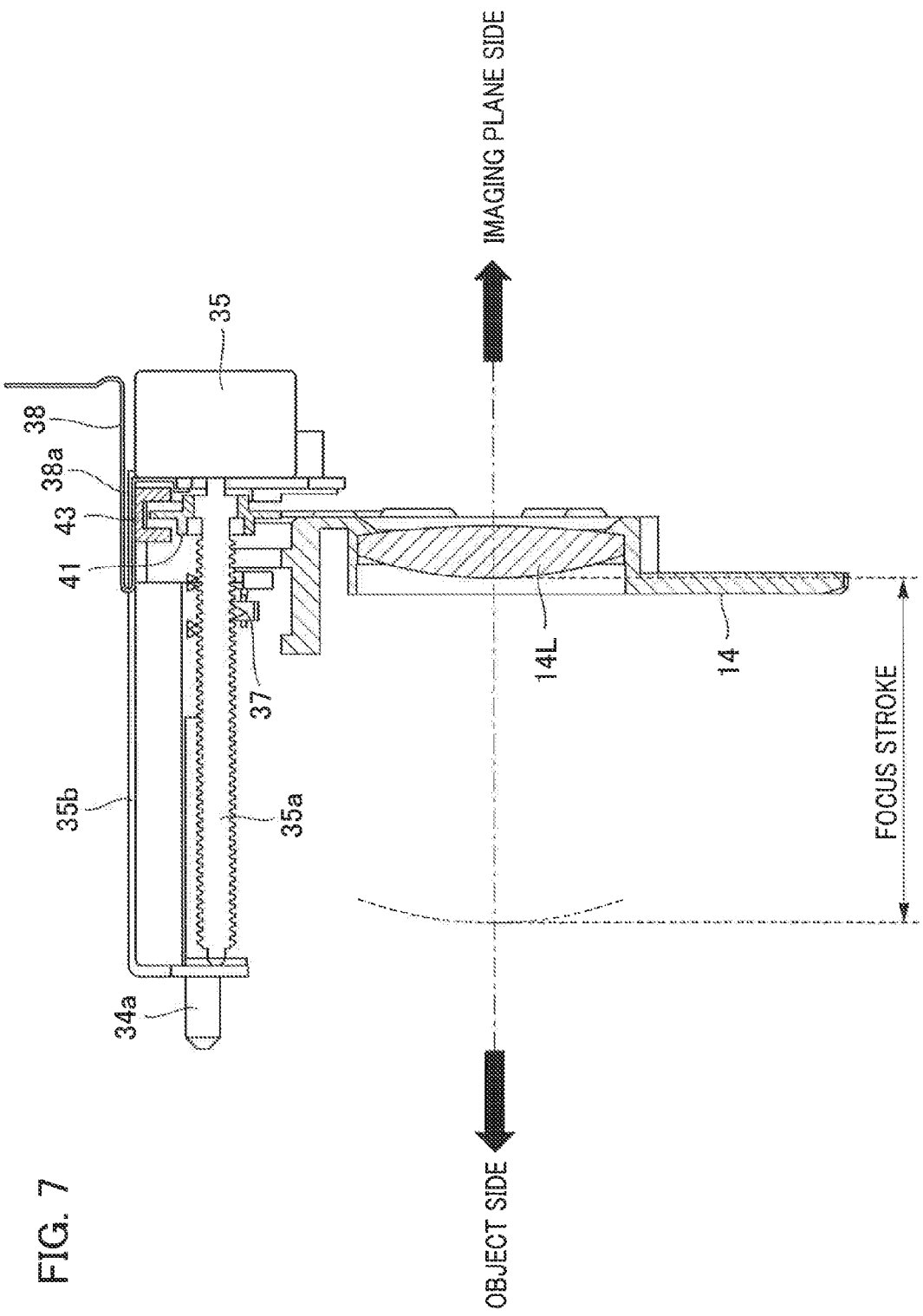
FIG. 7 is a cross-sectional view illustrating an exemplary mechanism on the periphery of a focus motor unit.

FIG. 7 is a cross-sectional view illustrating an exemplary mechanism on the periphery of a focus motor unit. More specifically, FIG. 7 is a cross-sectional view of the mechanism when the mechanism is cut along the plane including the optical axis and the center axis of the lead screw 35a.

The position of the fourth group holder is in a retracted state as shown in FIG. 5A. Given that the length of the photo interrupter 43 in the optical axis direction is L, the fourth group holder 14 or the fourth group lens 14L or a part of both the fourth group holder 14 and the fourth group lens 14L is entered into the length L when the fourth group holder 14 is retracted toward the drive unit side, i.e., the focus motor side. More specifically, the pulse plate 41 and the fourth group holder 14 or the fourth group lens 14L or both the fourth group holder 14 and the fourth group lens 14L are overlapped with each other as viewed from the direction orthogonal to the optical axis. With this arrangement, even when the mechanism including the pulse plate 41 for detecting a rotation pulse and the photo interrupter 43 is arranged on the periphery of the focus motor 35, the fourth group holder 14 can be retracted closer to the focus motor 35. The amount of retraction leads to an increase in focus stroke at infinity side, resulting in an improvement in degree of freedom in focus within a limited space. When the fourth group holder 14 is retracted toward the focus motor side, the photo interrupter 43 and the fourth group holder 14 or the fourth group lens 14L or both the fourth group holder 14 and the fourth group lens 14L may be overlapped with each other as viewed from the direction orthogonal to the optical axis.

While, in the present embodiment, a description has been given of the case where the fourth group holder 14 protrudes toward the imaging surface side than the fourth group lens 14L, the fourth group lens 14L may also protrude toward the imaging surface side than the fourth group holder 14. Also, in the present embodiment, a description has been given of the case where the photo interrupter 43 protrudes toward the object side than the pulse plate 41, the pulse plate 41 may also protrude toward the object side than the photo interrupter 43. In other words, any lens barrel may employ the configuration that the fourth group lens 14L can be retracted toward the imaging surface side more, after comprising a pulse detecting unit. (Second Embodiment)

Figure 8:
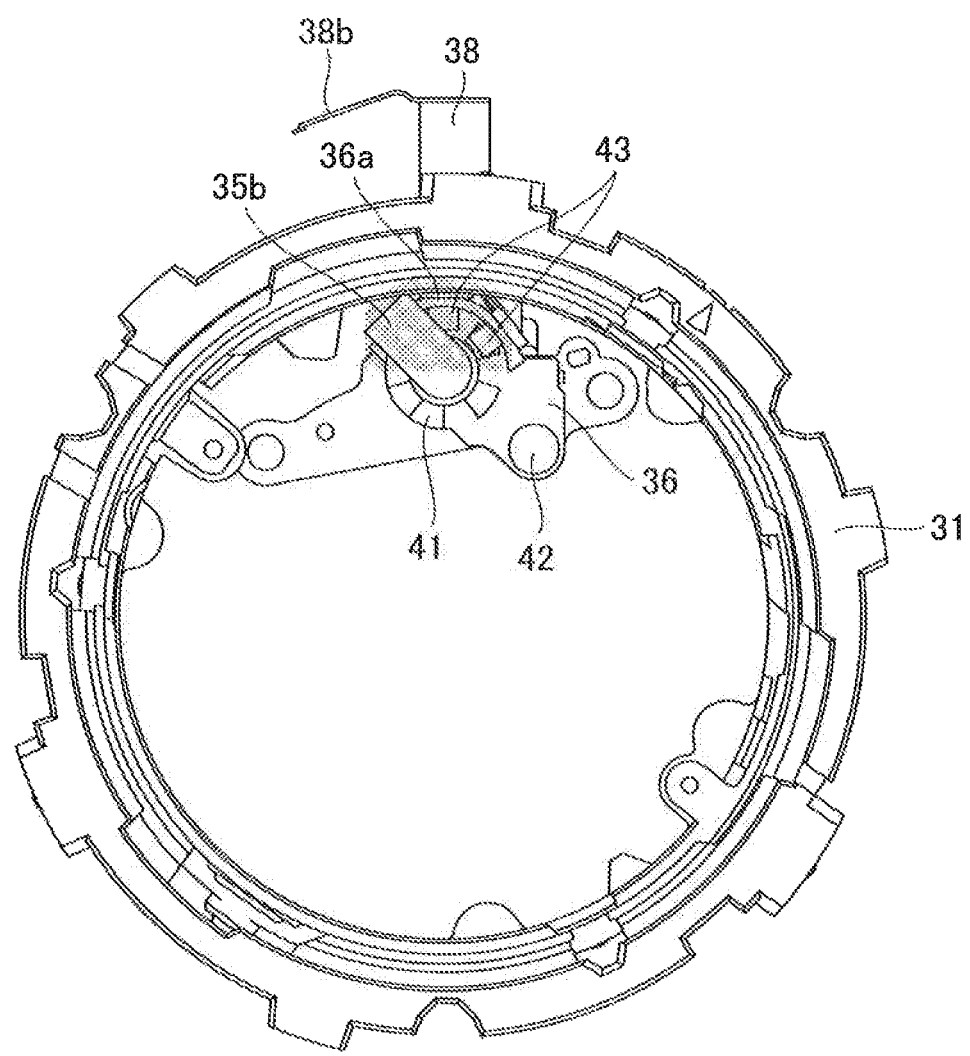
FIG. 8 is a diagram illustrating the positional relationship between a mechanism on the periphery of a focus motor and a fixed barrel as viewed from the object side in the optical axis direction.
Figure 9:
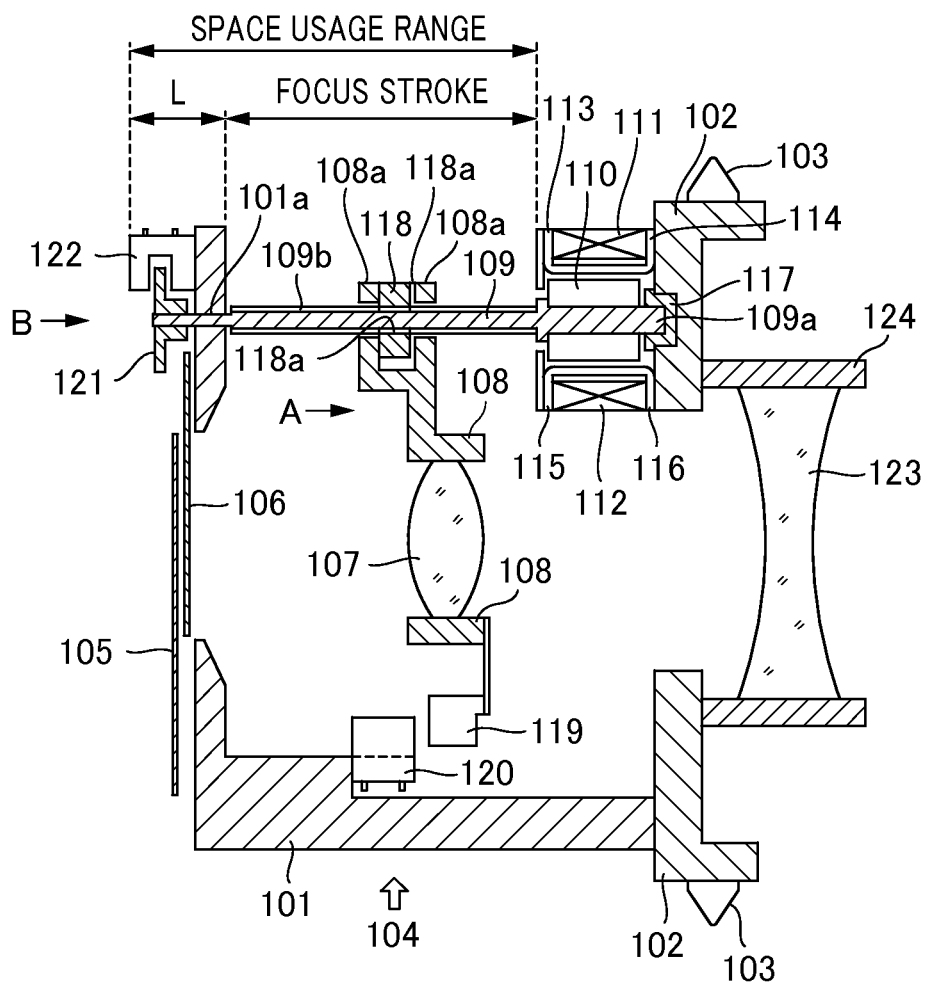
FIG. 9 is a diagram illustrating an example of a configuration of a device disclosed in Japanese Patent Laid-Open No. 2000-193877.

FIG. 8 is a diagram illustrating the positional relationship between a mechanism on the periphery of a focus motor and a fixed barrel as viewed from the object side in the optical axis direction.

Two photo interrupters 43 are provided in order to detect rotation direction by a phase difference between signals of the pulse plate 41. Two photo interrupters 43 are electrically connected by the flexible 38, finally, the two photo interrupters 43 are drawn out over the fixed barrel 31 to thereby be connected to the outer flexible by the connector section 38b. At this time, it is preferable that the flexible 38 is arranged closer to the inner peripheral side of the fixed barrel 31 in order to facilitate routing of the flexible 38 to the outside of the fixed barrel 31.

Also, the two photo interrupters 43 are held by the photo interrupter holder 36. A holding portion which holding the photo interrupters 43 that is provided in the photo interrupter holder 36 is provided with a vertical wall 36a for light press fitting. If the vertical wall 36a is provided on the optical axis side, light is reflected from the end surface of the vertical wall 36a and thus harmful light enters the imaging element 15, resulting in defects such as ghost or the like. Thus, it is preferable that the photo interrupter 43 is arranged at a position closer to the inner peripheral side of the fixed barrel 31 away from the optical axis as far as possible.

Also, a U-shaped sheet metal member (hereinafter referred to as "U-shaped sheet metal") of the focus motor 35 holds both ends of the lead screw 35a by the distal end of the lead screw 35a and the bearing in the interior of the focus motor 35. With this arrangement, vibration of the lead screw 35a upon rotation is suppressed. In other words, the U-shaped sheet metal integrally connects the flange portion 35c and the bearing on the distal end side of the lead screw 35a. The rise-bent portion 35b of the U-shaped sheet metal has a certain length in the optical axis direction depending on the length of the lead screw 35a. If the rise-bent portion 35b is provided on the optical axis side, light is reflected from the end surface of the rise-bent portion 35b and thus harmful light enters the imaging element 15, resulting in defects such as ghost or the like.

Thus, it is preferable that the rise-bent portion 35b of the U-shaped sheet metal is also arranged at a position closer to the inner peripheral side of the fixed barrel 31 away from the optical axis as far as possible. Thus, it is preferable that all the two photo interrupters 43 and the rise-bent portion 35b of the U-shaped sheet metal are arranged at positions closer to the inner peripheral side of the fixed barrel 31 away from the optical axis as far as possible, that is, are arranged within a semicircle located close to the inner peripheral side of the fixed barrel 31 considering the fact that the focus motor 35 is in a circular shape. In other words, when the rise-bent portion 35b and the photo interrupters 43 are projected onto a plane perpendicular to the optical axis, the rise-bent portion 35b and the photo interrupters 43 are arranged within a semi-circle located close to the inner periphery of the fixed barrel 31 (within a semicircular region hatched in FIG. 8). This is similarly applied to the case where a unit including the focus motor 35 is arranged at any position in the fixed barrel 31.

While, in the present embodiment, two photo interrupters 43 are adjacent to each other, the rise-bent portion 35b of the U-shaped sheet metal may also be arranged between two photo interrupters 43. Also, the number of photo interrupters 43 may be one if the photo interrupter 43 is used only for detection of signals of the pulse plate 41. The present invention is not limited to the disclosed exemplary embodiments but may include various modifications without departing from the spirit of the present invention.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-143742 filed on Jun. 27, 2012 which is hereby incorporated by reference herein in its entirety.

What is claimed is:

1. A lens barrel comprising:
a drive unit;
a lead screw that is provided on an axis of the drive unit and is rotatably driven by the drive unit;
a rotation member that is provided at a root section of the lead screw on the drive unit side and rotates integrally with the lead screw;
a detecting unit configured to detect rotation of the rotation member;
a linear motion member that is screwed to the lead screw and advances or retracts in the direction of the optical axis of an imaging optical system in accordance with the rotation drive of the lead screw; and
a lens holding frame that holds a lens which is part of the imaging optical system and advances or retracts in the direction of the optical axis by engaging with the linear motion member,
wherein in a case where the lens holding frame is retracted toward a drive unit side, the rotation member and the lens holding frame or the lens are overlapped with each other as viewed from the direction orthogonal to the optical axis.

2. The lens barrel according to claim 1, wherein in a case where the lens holding frame is retracted toward the drive unit side, the detecting unit and the lens holding frame or the lens are overlapped with each other as viewed from the direction orthogonal to the optical axis.

3. The lens barrel according to claim 1, further comprising:
a holding member configured to hold the detecting unit,
wherein in a case where the detecting unit is provided in plural, the holding member holds a plurality of the detecting units such that the plurality of detecting units are disposed in a radial direction about the axis of the drive unit.

4. The lens barrel according to claim 2, further comprising:
a holding member configured to hold the detecting unit,
wherein in a case where the detecting unit is provided in plural, the holding member holds the detecting units such that the detecting units are disposed in the radial direction about the axis of the drive unit so as to form a predetermined angle between adjacent detecting units.

5. The lens barrel according to claim 3, further comprising:
a flexible substrate that electrically connects the terminal section of the drive unit and the detecting unit,
wherein the drive unit, the lead screw, the rotation member, the holding member, and the flexible substrate are assembled as a unitized component.

6. The lens barrel according to claim 5, further comprising:
a U-shaped member that integrally connects a flange portion of the drive unit and a bearing on a distal end side of the lead screw; and
a fixed barrel that incorporates the unitized component,
wherein in a case where a rise-bent portion of the U-shaped member and the detecting unit are projected onto a plane perpendicular to the optical axis, the rise-bent portion of the U-shaped member and the detecting unit are arranged within a semi-circle located close to the inner periphery of the fixed barrel.

7. The lens barrel according to claim 6, wherein in a case where the rise-bent portion of the sheet metal member and the detecting unit are projected onto a plane perpendicular to the optical axis and the detecting unit is provided in plural, the rise-bent portion of the U-shaped member is arranged between the adjacent detecting units.

8. An imaging apparatus comprising:
the lens barrel according to claim 1.

9. An imaging apparatus that moves a lens of an imaging optical system in the direction of the optical axis of the imaging optical system, the imaging apparatus comprising:
a drive unit that drives the lens;
a lead screw that is provided on an axis of the drive unit and is rotatably driven by the drive unit;
a rotation member that is provided at a root section of the lead screw on the drive unit side and rotates with the lead screw;
a detecting unit configured to detect rotation of the ratation member;
a linear motion member that is screwed to the lead screw and advances or retracts in the direction of the optical axis of an imaging optical system in accordance with the rotation drive of the lead screw; and
a lens holding frame that holds a lens which is part of the imaging optical system and advances or retracts in the direction of the optical axis by engaging with the linear motion member,
wherein in a case where the lens holding frame is retracted toward the drive unit side, the rotation member and the lens holding frame or the lens are overlapped with each other as viewed from the direction orthogonal to the optical axis.

10. A lens barrel comprising:
a drive unit;
a lead screw that is provided on an axis of the drive unit and is rotatably driven by the drive unit;
a rotation member that is provided at a root section of the lead screw on the drive unit side and rotates with the lead screw;
a detecting unit configured to detect rotation of the rotation member;
a linear motion member that is screwed to the lead screw and advances or retracts in the direction of the optical axis of an imaging optical system in accordance with the rotation drive of the lead screw; and
a lens holding frame that holds a lens which is part of the imaging optical system and advances or retracts in the direction of the optical axis by engaging with the linear motion member,
wherein in a case where the lens holding frame is retracted toward the drive unit side, the detecting unit and the lens holding frame or the lens are overlapped with each other as viewed from the direction orthogonal to the optical axis.

11. The lens barrel according to claim 10, further comprising:
 a holding member configured to hold the detecting unit,
 wherein in a case where the detecting unit is provided in plural, the holding member holds a plurality of the detecting units such that the plurality of detecting units are disposed in a radial direction about the axis of the drive unit.

12. The lens barrel according to claim 11, further comprising:
 a flexible substrate that electrically connects the terminal section of the drive unit and the detecting unit,
 wherein the drive unit, the lead screw, the rotation member, the holding member, and the flexible substrate are assembled as a unitized component.

13. The lens barrel according to claim 12, further comprising:
 a U-shaped member that integrally connects a flange portion of the drive unit and a bearing on a distal end side of the lead screw; and
 a fixed barrel that incorporates the unitized component,
 wherein in a case where a rise-bent portion of the U-shaped member and the detecting unit are projected onto a plane perpendicular to the optical axis, the rise-bent portion of the U-shaped member and the detecting unit are arranged within a semi-circle located close to the inner periphery of the fixed barrel.

14. The lens barrel according to claim 13, wherein in a case where the rise-bent portion of the sheet metal member and the detecting unit are projected onto a plane perpendicular to the optical axis and the detecting unit is provided in plural, the rise-bent portion of the U-shaped member is arranged between the adjacent detecting units.

15. An imaging apparatus that moves a lens of an imaging optical system in the direction of the optical axis of the imaging optical system, the imaging apparatus comprising:
 a drive unit that drives the lens;
 a lead screw that is provided on an axis of the drive unit and is rotatably driven by the drive unit;
 a rotation member that is provided at a root section of the lead screw on the drive unit side and rotates with the lead screw;
 a detecting unit configured to detect rotation of the rotation member;
 a linear motion member that is screwed to the lead screw and advances or retracts in the direction of the optical axis of an imaging optical system in accordance with the rotation drive of the lead screw; and
 a lens holding frame that holds a lens which is part of the imaging optical system and advances or retracts in the direction of the optical axis by engaging with the linear motion member,
 wherein in a case where the lens holding frame is retracted toward the drive unit side, the detecting unit and the lens holding frame or the lens are overlapped with each other as viewed from the direction orthogonal to the optical axis.

* * * * *